Figure 1:
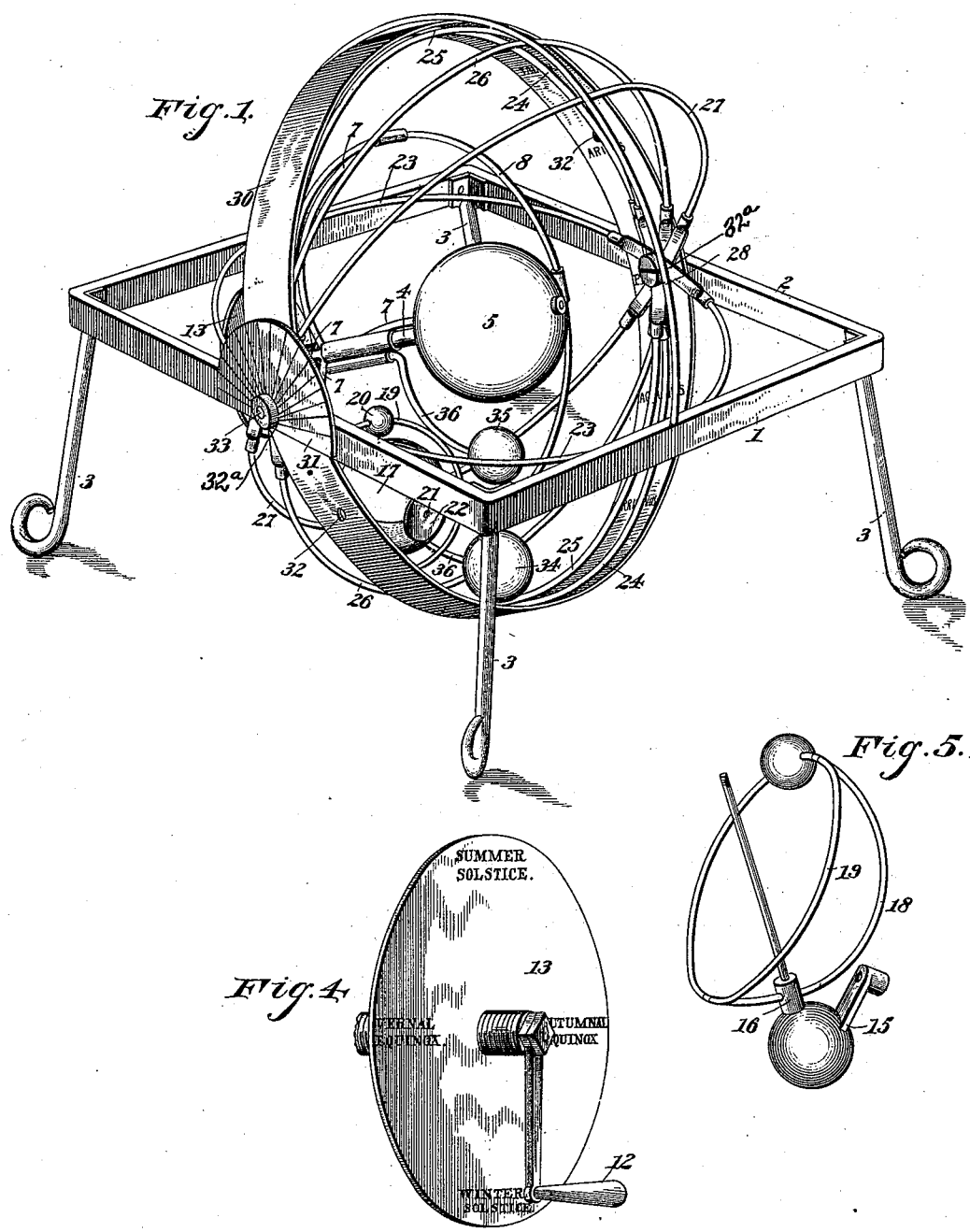

(No Model.) 2 Sheets—Sheet 1.

S. M. GIBBS.
ARMILLARY SPHERE.

No. 511,420. Patented Dec. 26, 1893.

Witnesses:

Inventor,
Sylvester M. Gibbs,
By his Attorneys,
C. A. Snow & Co.

(No Model.)  2 Sheets—Sheet 2.

S. M. GIBBS.
ARMILLARY SPHERE.

No. 511,420. Patented Dec. 26, 1893.

Witnesses:

Inventor,
Sylvester M. Gibbs,
By his Attorneys,

THE NATIONAL LITHOGRAPHING COMPANY,
WASHINGTON, D. C.

UNITED STATES PATENT OFFICE.

SYLVESTER M. GIBBS, OF DANVILLE, PENNSYLVANIA.

ARMILLARY SPHERE.

SPECIFICATION forming part of Letters Patent No. 511,420, dated December 26, 1893.

Application filed November 19, 1892. Serial No. 452,526. (No model.)

*To all whom it may concern:*

Be it known that I, SYLVESTER M. GIBBS, a citizen of the United States, residing at Danville, in the county of Montour and State of Pennsylvania, have invented a new and useful Armillary Sphere, of which the following is a specification.

My invention relates to improvements in apparatus for illustrating to the eye the relative, real and apparent, positions and movements of the earth, sun, moon, and stars; the object of my invention being to exhibit accurately and truthfully the ellipticity of the earth's orbit and its position with relation to the sun, the latter being located in one of the foci of the ellipse; the inclination of the earth's axis to the plane of the ecliptic, the parallelism of the axis during the entire yearly revolution, the changes of the axis and of the poles in their relations to the plane of the ecliptic and the direction of the sun's rays north and south of the equator, before and after passing the equinoxes; the positions of the earth at the vernal and autumnal equinoxes, at summer and winter solstices, and in perihelion and aphelion; the relative positions and apparent movement of the sun through the constellations of the zodiac; the phenomena of eclipses, conjunctions, oppositions, diurnal revolution producing day and night, sunrise and sunset, the causes of the constant change of the proportionate periods, in different regions, of the divisions of time due to the diurnal revolutions, the seasons, the rising and setting of certain stars and constellations, and the relation between the earth and such stars and constellations as are affected by the relative positions of the earth and the sun; the equation of time; the modes and phases of the moon; the relation of the plane of its orbit to that of the earth; the precession of the equinoxes or the retrogression of the equinoctial points; to represent the systems of imaginary circles in the sky by material rings, and to provide means whereby such circles, and also the planes of the orbits of the moving celestial bodies may be adjusted to represent their positions in the latitude of the observer.

With these objects in view, my invention consists in a certain novel construction, combination, and arrangement of parts which are clearly illustrated in the accompanying drawings and described in detail in connection therewith, the novel features of my improvement being particularly pointed out in the appended claims.

Figure 2:
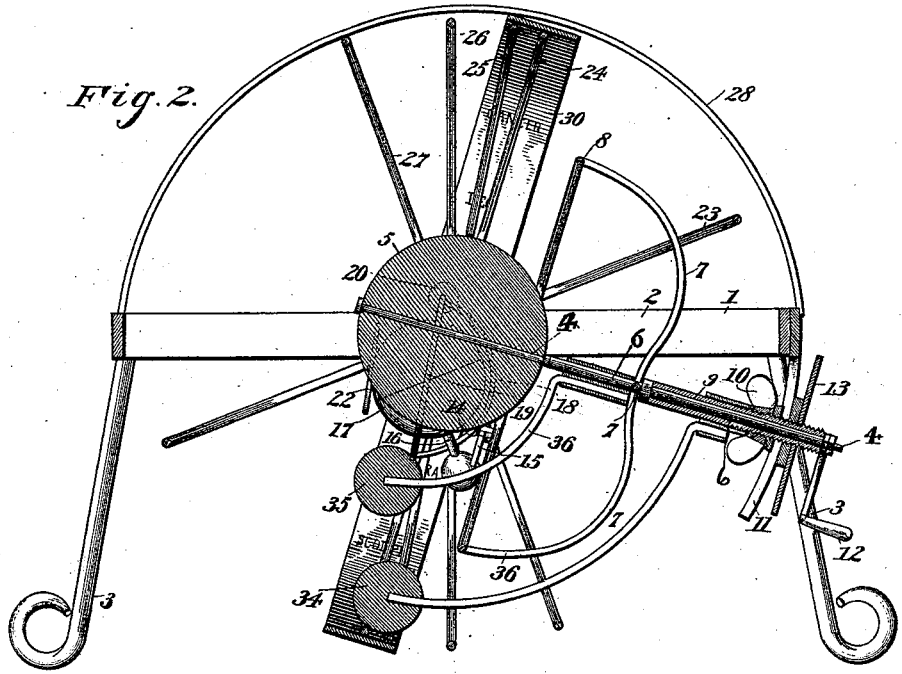
Figure 3:
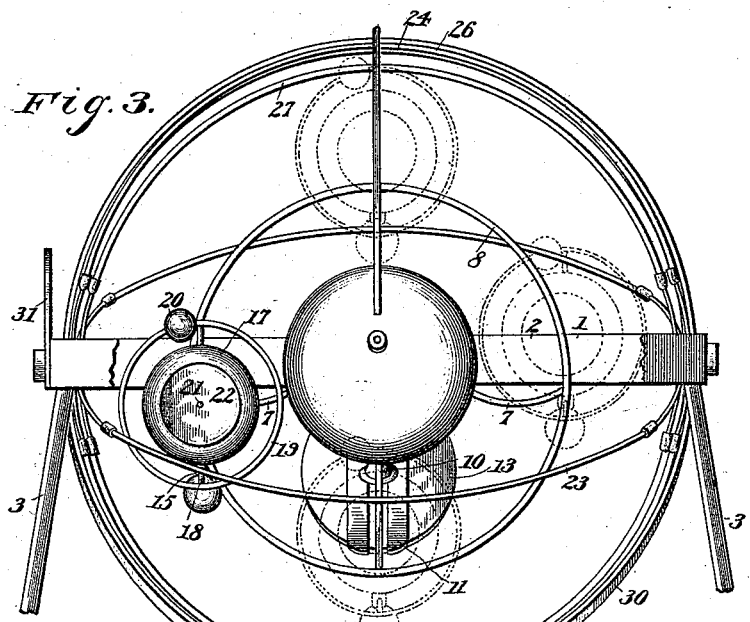

In the drawings: Figure 1 is a perspective view of an apparatus embodying my invention. Fig. 2 is a vertical section taken parallel with the axis of the sun's rotation. Fig. 3 is a front view showing in full and dotted lines various positions of the earth during its yearly revolution. Fig. 4 is a detail view of the dial by which the position of the earth in its orbit is adjusted. Fig. 5 is a detail view in perspective of the weighted hanger supporting the earth's axis and the moon's orbit.

1 represents the supporting framework, consisting of a horizontal rectangular frame 2, and supporting-legs 3.

4 is a spindle representing the axis of the sun, upon which the globe or sphere 5, which symbolizes the sun, is loosely mounted, whereby the rotation of the sun about its axis may be demonstrated.

Mounted upon the spindle 4 is a sleeve 6, carrying a spider 7, whose arms support a circle 8, which circle is parallel with the plane of the orbit of the earth. The sleeve 6 is mounted in an elongated bearing 9, which is secured by means of a thumb-nut 10 to a curved supporting-arm 11, which depends from one side of the frame 2. This arm is concentric with the center of the globe representing the sun and is slotted to receive the tubular bearing 9 which may be clamped at any desired point of the arm by means of the said thumb-nut. The sleeve 6 projects through and beyond the extremity of the bearing and is provided with a handle 12, which travels over a stationary dial 13, which is marked to indicate various positions of the earth during its yearly revolution.

The circle 8 is provided with a pin 14, upon which is swiveled a depending weighted arm 15, carrying the axis 16, of the loosely-revoluble globe 17, which represents the earth. The rotation of the earth around its axis, or the diurnal revolution, may be accomplished by hand. The axis of the earth is inclined at an angle of twenty-three and one-half degrees to a perpendicular projected upon the plane of the circle 8, or upon the plane of the orbit of the earth, (which is necessarily parallel with the plane of said circle 8.)

Mounted revolubly upon the spindle representing the axis of the earth is a spider 18, carrying a circle 19, which represents the orbit of the moon around the earth and whose plane is inclined at an angle of five degrees to the plane of the orbit of the earth. A small globe 20, fixed to the circle 19, represents the moon.

Adjustably attached to the surface of the globe 17, which represents the earth, and held in place by means of a pin 21, or other analogous device, is a disk 22, which is thus held in a plane tangential to the surface of the sphere and represents the sensible horizon. The material of the globe 17 is such as to permit of its being punctured by the pin 21, whereby the disk may be arranged at any desired point upon its surface. By placing this disk at different points upon the surface of the globe representing the earth the position of an imaginary observer may be visibly indicated, or the relative position of the actual student or observer may be shown.

Revolubly attached to diametrically opposite points of the frame 2 is a series of rings which intersect at common points at opposite sides of the frame 2, said points being arranged in a horizontal plane which passes through the center of the globe representing the sun. These rings are independently adjustable and represent certain imaginary lines as follows: 23 represents the celestial equator; 24 the ecliptic; 25 the projected orbit of the moon; 26 the prime vertical; and 27 a colure.

28 represents a colure, which is arranged at right angles to, and intersects the colure 27 at a point corresponding with, or in alignment with, the north pole.

30 is a band representing the zodiac, which extends eight degrees on each side of the ecliptic and is adjustable therewith.

31 represents a graduated indicator, upon which are inscribed angles to assist the operator in the adjustment of the rings or circles to suit the position or location of the observer.

In operation, the sleeve which carries the circle bearing the globe or sphere which represents the earth may be revolved by means of the handle with which it is provided, thereby causing the earth to travel in its orbit around the sun. It will be noted that by reason of the weighted and swiveled arm upon which the earth is supported the latter travels in an elliptical path corresponding with the actual orbit of the earth. In aphelion the earth is more remote from the sun than in perihelion. The band representing the zodiac is provided with additional perforations 32, by which it may be adjusted to represent the positions of the signs of the zodiac as at the time of Hipparchus when the sun was visible in Aries at the time of the vernal equinox. The position of the signs of the zodiac at the present time is indicated when the band representing the zodiac is secured in place with the spindles 33 engaged in the perforations 32$^a$ of the band, in which adjustment the sun is seen in Pisces at the time of the vernal equinox. Thus the precession of the equinoxes and the retrogression of the equinoctial point, is visibly indicated.

The names of the signs of the zodiac are indicated upon the surface of the band 30.

In Fig. 3 the position of the sun in vernal equinox is shown in full lines, and it will be observed that in this position of the earth the sun is between the earth and that portion of the band 30 which is marked with the sign Pisces. The earth is also indicated in dotted lines in three other positions, viz: in summer solstice, in autumnal equinox, and in winter solstice, successively.

34 and 35 represent, respectively, imaginary planets which are provided with supporting-arms 36, by which said planets may be arranged to rotate around the axis of the sun. The planet 35, which is provided with a short supporting-arm, is arranged to rotate or travel in an orbit which is smaller than that of the earth, and the planet 34 is arranged to travel in an orbit which is larger and encircles that of the earth. In other words, these planets 34 and 35 represent, respectively, the superior and inferior planets, and by arranging them in suitable imaginary relations with the earth and sun, superior and inferior conjunctions may be represented, and also those positions of the celestial bodies as seen when in opposition and in quadrature.

To adjust the parts to correspond with the position upon the surface of the earth of the student or observer, or of an imaginary observer, the ring or circle 23, which represents the celestial equator, is arranged at an angle to a horizontal plane as the plane of the frame 2 which corresponds with the difference between the latitude of the observer and ninety degrees; the ecliptic is arranged at a deflection of twenty-three and one-half degrees from the plane of the equator; the ring or circle 25, which represents the orbit of the moon, is arranged at an angle of about five degrees from the plane of the ecliptic; and the ring or circle 26, which represents the prime vertical, which corresponds with the zenith of the observer, is arranged at an angle from the plane of the equator which corresponds with the latitude of the observer. The ring or circle 27, which represents one of the colures shown in the drawings, and which, by its intersection with the other colure, indicates the direction of the north pole, is arranged at an angle of ninety degrees from the plane of the equator. When properly adjusted, the plane of the orbit of the earth will correspond with and lie in the plane of the ring or circle which represents the ecliptic, it being understood that the axis of the sun must be arranged perpendicular to the plane of the ecliptic by the adjustment of the sleeve which carries the circle 8, by means of the thumb-nut and the slotted bracket or supporting-arm. The axis of the earth is inclined to the plane of the earth's orbit, which inclination remains the same in all positions and in all adjustments of the parts of the apparatus to represent that the parallelism of the axis of the earth is constant.

The pivoted rings and band which are employed to represent the various celestial circles enable the student to become familiar with the manner of adjusting these parts to agree with his location upon the earth's surface. The horizontal plane which is represented by the frame 2 represents the horizontal plane of the observer, and assuming that the observer is stationed at a certain point upon the surface of the earth, the rings and band may be adjusted in accordance therewith, the relative positions of the various rings and band being above set forth. Furthermore, the pivoted rings and band may be loosened and folded parallel or approximately parallel with the frame 2 when it is desired to prepare the device for transportation.

The manipulation of the apparatus to show diurnal changes, the relative positions of the celestial bodies during eclipses, and the relation between the different points on the surface of the earth and the sun, whereby the proportionate lengths of day and night at different seasons of the year, and the varying temperatures at different seasons are governed, will be readily understood without particular description herein. Furthermore, various other celestial phenomena may be visibly demonstrated by means of the apparatus herein described, but the particular relative positions of the parts necessary to represent these phenomena need not be specifically explained, as they will be understood by those familiar with the subject.

It will be noted that I have avoided all complication in the way of mechanism, in order to provide a cheap and at the same time accurate device for demonstrating astronomical phenomena and making them clear to the mind of the student.

The balls or planets 34 and 35 are not intended to represent particular planets. They merely represent two great classes of planets, namely: the inferior and superior in order that the phenomena of conjunctions, oppositions, &c., may be explained in an abstract manner, and the supporting arms of these imaginary planets are detachable from the spindle of the globe representing the sun, so as to be out of the way when demonstrating other phenomena.

Changes in the form, proportion, and minor details of construction may be resorted to without departing from the principles or sacrificing the advantages of this invention.

Having described the invention, what I claim is—

1. In a device of the class described, a horizontal supporting frame provided with opposite pivots 33 upon which are mounted independently adjustable rings, representing meridians on the celestial sphere a fixed graduated indicator arranged concentrically with one of said pivots, and globes representing the various bodies of the solar system substantially as set forth.

2. The combination of a supporting frame having opposite pivots, independently adjustable rings representing meridians on the solar sphere and mounted upon such pivots, a band 30 mounted upon the pivots, a graduated indicator, and globes representing the various bodies of the solar system substantially as set forth.

3. The combination with a supporting frame, of a spindle, a globe mounted upon such spindle, a rotatable frame carried by the spindle, a swinging weighted arm connected to said rotatable frame, and a spindle connected to the said arm and bearing a globe, substantially as specified.

4. The combination with a supporting frame, having a curved arm 11, of a spindle, means for clamping the same to said arm, a globe 5, and a rotatable frame mounted upon the said spindle, and a swinging weighted arm connected to said rotatable frame and provided with a spindle bearing a globe, substantially as set forth.

5. The combination with a supporting frame, of a depending curved slotted arm 11, a spindle 4 bearing a globe 5, a sleeve 6, a tubular bearing 9, threaded exteriorly, a clamping nut 10, a spider 7 and ring 8 supported by said sleeve, and a weighted swinging arm provided with a spindle bearing a globe 17, substantially as set forth.

6. The combination with a globe 5 representing the sun, of a rotary frame concentric with the globe 5 and carrying a globe representing the earth, said frame being capable of angular adjustment with relation to a horizontal plane to correspond with the latitude of the observer, substantially as specified.

In testimony that I claim the foregoing as my own I have hereto affixed my signature in the presence of two witnesses.

SYLVESTER M. GIBBS.

Witnesses:
J. H. SIGGERS,
E. G. SIGGERS.